US009031573B2

United States Patent
Khorashadi et al.

(10) Patent No.: US 9,031,573 B2
(45) Date of Patent: May 12, 2015

(54) CONTEXT-BASED PARAMETER MAPS FOR POSITION DETERMINATION

(71) Applicant: QUALCOMM Incorporated, San Diego, CA (US)

(72) Inventors: Behrooz Khorashadi, Mountain View, CA (US); Sameera Poduri, Santa Clara, CA (US); Vinay Sridhara, Santa Clara, CA (US); Payam Pakzad, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 13/831,343

(22) Filed: Mar. 14, 2013

(65) Prior Publication Data

US 2014/0187258 A1    Jul. 3, 2014

Related U.S. Application Data

(60) Provisional application No. 61/747,976, filed on Dec. 31, 2012.

(51) Int. Cl.
*H04W 24/00* (2009.01)
*H04W 64/00* (2009.01)
*G01C 21/20* (2006.01)
*H04W 4/02* (2009.01)

(52) U.S. Cl.
CPC ............ *H04W 64/00* (2013.01); *G01C 21/206* (2013.01); *H04W 4/025* (2013.01)

(58) Field of Classification Search
None
See application file for complete search history.

(56) References Cited

U.S. PATENT DOCUMENTS

| 2010/0299615 | A1 | 11/2010 | Miluzzo et al. | |
|---|---|---|---|---|
| 2011/0081918 | A1* | 4/2011 | Burdo et al. | 455/456.1 |
| 2011/0161262 | A1 | 6/2011 | Jager | |
| 2011/0219422 | A1 | 9/2011 | Shen et al. | |
| 2011/0246490 | A1 | 10/2011 | Jonsson | |
| 2012/0176525 | A1 | 7/2012 | Garin et al. | |
| 2014/0141803 | A1* | 5/2014 | Marti et al. | 455/456.2 |

FOREIGN PATENT DOCUMENTS

| WO | WO-2009021068 | A1 | 2/2009 | |
|---|---|---|---|---|
| WO | WO 2009021068 | A1 * | 2/2009 | ............ G01C 21/16 |
| WO | WO-2010129766 | A1 | 11/2010 | |
| WO | WO-2012009328 | A1 | 1/2012 | |

OTHER PUBLICATIONS

International Search Report and Written Opinion—PCT/US2013/077959—ISA/EPO—Apr. 22, 2014.

* cited by examiner

*Primary Examiner* — Olumide T Ajibade Akonai
*Assistant Examiner* — Margaret G Mastrodonato
(74) *Attorney, Agent, or Firm* — Berkeley Law & Technology Group, LLP

(57) ABSTRACT

In one implementation, a method may comprise: storing a user profile indicative of at least one attribute of a user of a mobile station; determining a measurement value based, at least in part, on a signal from at least one sensor on the mobile station; and estimating a location of the mobile station based, at least in part, on an association of the at least one attribute and the measurement value with a context parameter map database.

43 Claims, 8 Drawing Sheets

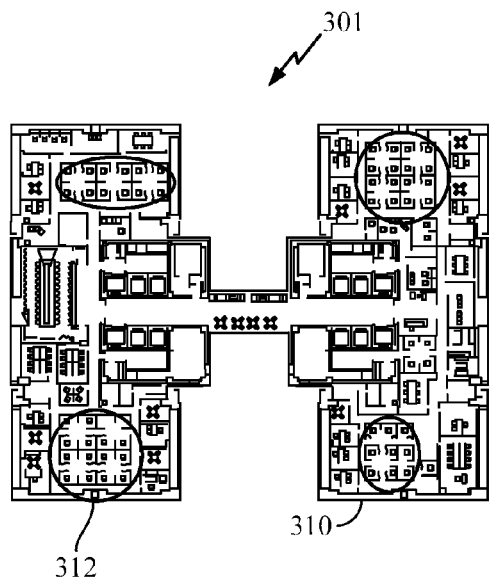
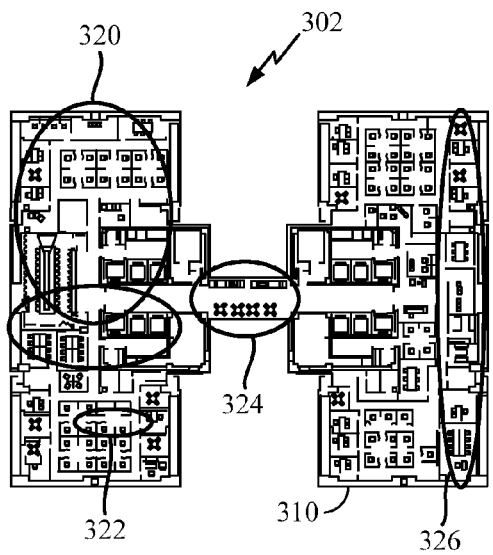
FIG. 3A
FIG. 3B
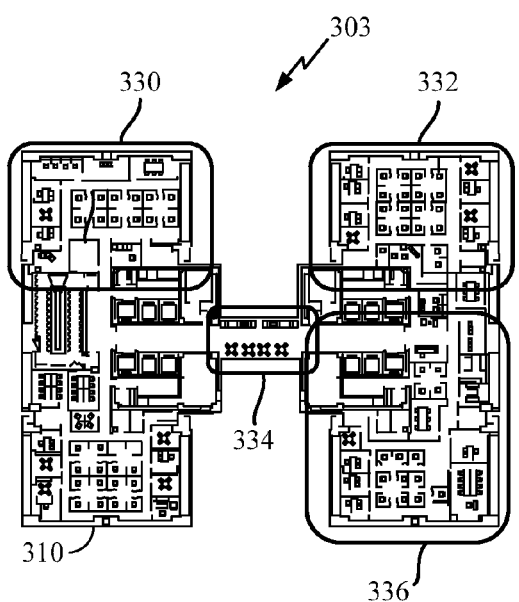
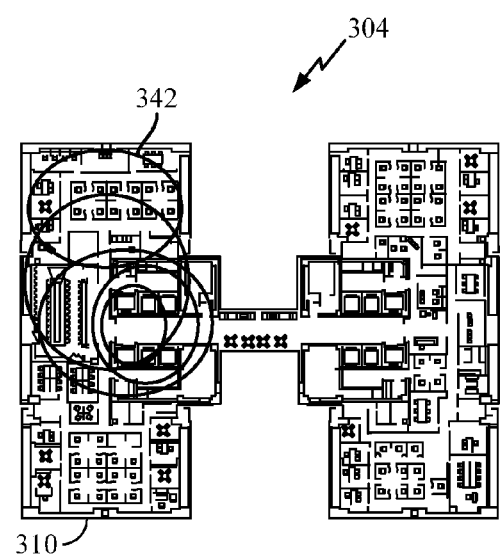
FIG. 3C
FIG. 3D

CONTEXT-BASED PARAMETER MAPS FOR POSITION DETERMINATION

This patent application claims benefit of and priority to U.S. Provisional Patent Application Ser. No. 61/747,976, filed on Dec. 31, 2012, entitled "Context-Based Parameter Maps for Position Determination," the contents of which are incorporated herein by reference in their entirety.

BACKGROUND

1. Field

The subject matter disclosed herein relates to wireless communication systems, and more specifically, to position determination methods and apparatuses for use with and/or by wireless mobile stations.

2. Information

GPS and other like satellite positioning systems have enabled navigation services for mobile handsets in outdoor environments. Since satellite signals may not be reliably received or acquired in an indoor environment, different techniques may be employed to enable navigation services. For example, mobile stations may obtain a position fix by measuring ranges to three or more terrestrial wireless access points that are positioned at known locations. Such ranges may be measured, for example, by obtaining a MAC ID address from signals received from such access points and obtaining range measurements to the access points by measuring one or more characteristics of signals received from such access points such as, for example, signal strength and round trip delay.

A navigation system may provide navigation assistance or mapped features to a mobile station as it enters a particular area. For example, in some implementations, an indoor navigation system may selectively provide assistance information to mobile stations to facilitate and/or enable location services. Such assistance information may include, for example, information to facilitate measurements of ranges to wireless access points at known fixed locations. For example, "radio context parameter map" data indicating expected received-signal-strength-indicator (RSSI) or round-trip time (RTT) values associated with access points may enable a mobile station to associate signal measurements with locations in an indoor area. By matching measured RSSI or RTT values of acquired signals marked with particular MAC IDs with the RSSI or RTT values expected for signals marked by these particular MAC IDs at a specific location, the location of the receiver may be inferred to be at the specific location.

BRIEF DESCRIPTION OF THE FIGURES

Non-limiting and non-exhaustive features will be described with reference to the following figures, wherein like reference numerals refer to like parts throughout the various figures.

FIGS. 3A, 3B, 3C, 3D, and 3E show four examples of context parameter maps for a floor of a building, according to an implementation.

SUMMARY

Figure 1:
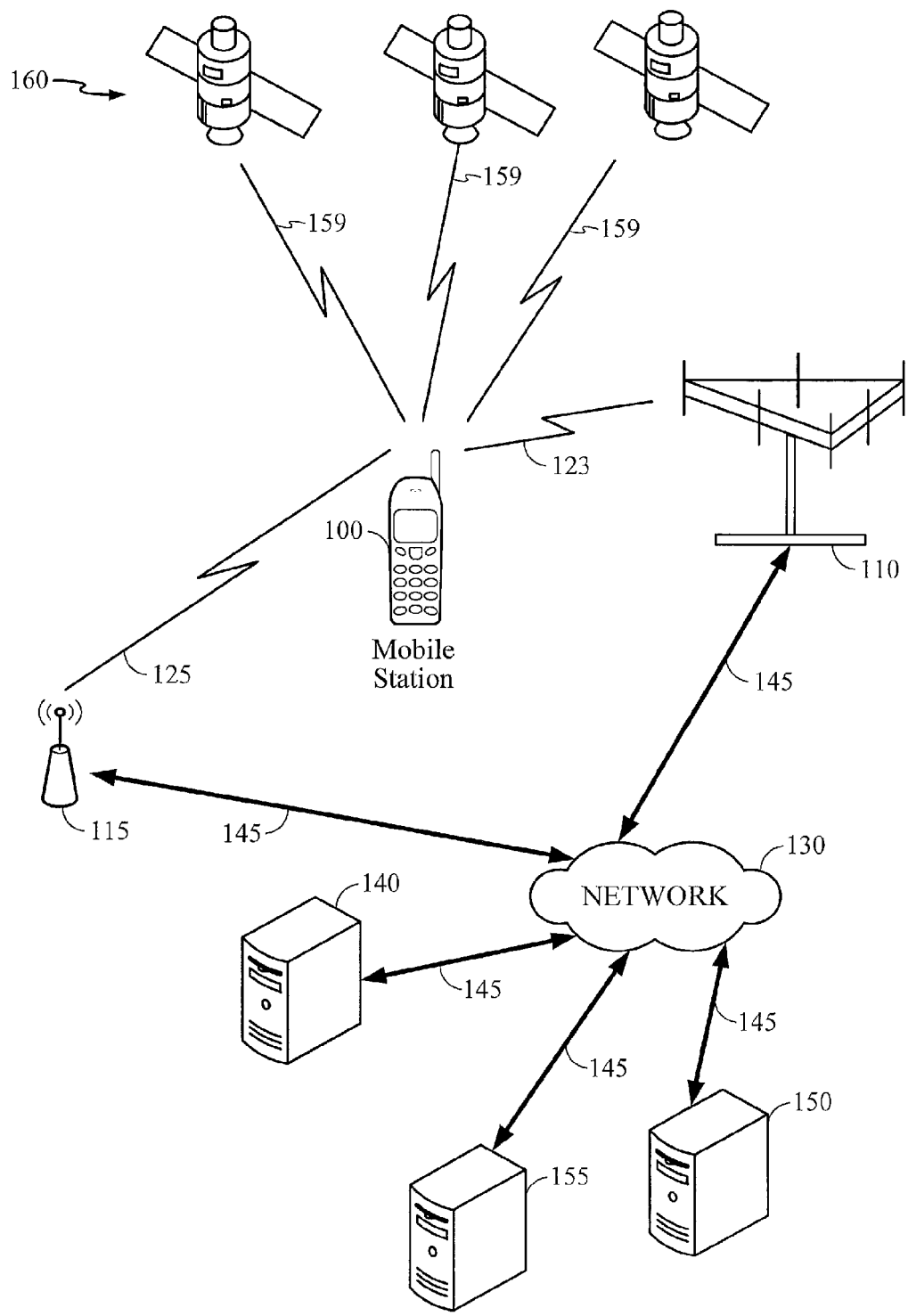
FIG. 1 is a system diagram illustrating certain features of a system containing a mobile station, in accordance with an implementation.

In an implementation, a method performed at a mobile station may comprise: determining a measurement value based, at least in part, on a signal from at least one sensor on the mobile station; and estimating a location of the mobile station based, at least in part, on an association of the measurement value with a context parameter map.

In another implementation, an apparatus may comprise: means for determining a measurement value based, at least in part, on a signal from at least one sensor on a mobile station; and means for estimating a location of the mobile station based, at least in part, on an association of the measurement value with a context parameter map.

In still another implementation, an apparatus may comprise: a sensor to produce a signal based, at least in part, on a measurement of a sensor parameter; and one or more processing units to: determine a measurement value based, at least in part, on the signal from the sensor; and estimate a location of a mobile station based, at least in part, on an association of the measurement value with a context parameter map.

In yet another implementation, a non-transitory storage medium may comprise machine-readable instructions stored thereon that are executable by a special purpose computing device to: determine a measurement value based, at least in part, on a signal from at least one sensor on a mobile station; and estimate a location of the mobile station based, at least in part, on an association of the measurement value with a context parameter map.

In yet another implementation, a method may comprise collecting sensor data from one or more sensors associated with a mobile device, and applying a positioning technique to the sensor data to determine a position of the mobile device. The method may further comprise applying the positioning technique to social data. The positioning technique may comprise use of a particle filter or probabilistic positioning. The sensor data may comprise audio spectra or intensity, light spectra or intensity, temperature data, or pressure data.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile station which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some implementations, a "mobile station" may comprise a device that does not, cannot, or is not configured to wirelessly communicate with other entities. Thus, while a mobile station may be described in some embodiments as including wireless functionality or wirelessly communicating with one or more other devices, embodiments may include other implementations.

Various techniques are described herein which may be implemented in one or more land-based computing platforms or an MS to determine indoor positioning using context parameter maps, sensor measurements, an inferred user state, and/or a user profile. In an implementation, a user state may comprise user motion. For example, user motion may comprise an activity state of a user of an MS, such as whether the user is sitting, standing, walking, and so on. User motion may also comprise moving speed, turn-rate, shape of trajectory of a path followed by a user, and so on. A user profile may comprise a user's age, sex, occupation, buying behavior, product consumption, club or group association, daily habits (e.g., time of day or duration that a user takes a lunch break, etc.), and so on. Measurements of sensors may comprise measurements for temperature, light or sound intensity or spectra, pressure, compass reading, and so on. In an implementation, such sensors may generate signals responsive to movements of a user co-located with the MS. For example, a pressure sensor of an MS co-located with a user may detect an upward or downward change in elevation (e.g., change in pressure), thus indicating the user may be on an escalator or elevator. Sensor signals may be processed to classify a motion or movement of the user co-located with the mobile device. Such a classified motion, which may be stored in a memory, may correspond to at least one state or attribute of the user.

According to an implementation, a location of a user co-located with an MS may be estimated based, at least in part, on an association of at least one attribute of the user and a measurement value from at least one sensor on the MS with a context parameter map, which is described in detail below. For example, sensors on an MS may measure particular parameters that, if compared to a context parameter map of an area, may lead to a determination that a user co-located with the MS is located in a particular location or in one of several possible locations. Moreover, a user profile may be utilized to narrow the list of possible locations. For example, one or more sensors on an MS may indicate that a user co-located with the MS is located either in a lobby, a gift shop, or a drinking bar of a hotel. A user profile may be utilized to determine which of these three possible locations the user is most likely located. For example, a user profile may include the age of the user. A likelihood that the user is located in the drinking bar may be ruled out (or reduced) if the user is ten years old or a member of a particular non-drinking religious faith, for example. Further, a likelihood that the user is located in the gift shop may be determined to be relatively high if the user's profile indicates that the user is a frequent shopper. In this example, time of day or shopping history may also be considered to account for whether the gift shop or drinking bar is open. In some embodiments, a determination is based on information other than whether a user profile meets conditions of a known location. For example, a user profile may be compared against age distributions and/or probabilities for one or more of the above-listed areas to determine a likely location of the user.

In an implementation, an MS may include a calendar, a clock, inertial sensors (e.g., accelerometer, gyroscope, magnetometer, etc.), a proximity sensor, a temperature sensor, a compass, a gravitometer, or an audio sensor, just to name a few examples. Measured sensor values (e.g., audio spectra or intensity, light spectra or intensity, temperature, pressure, etc.) for an indoor region may be compared to expected sensor signature values in a context parameter map. By performing such a comparison, matches between or among the measured sensor values and the expected sensor signature values may be determined. Moreover, stored or measured parameters representing attributes of a user may be compared to expected parameters representing user motion or user characteristics for a plurality of locations covered by a context parameter map (e.g., which may associate classified user motion with such locations). For example, a context parameter map may indicate a number of locations in a building where stairs, escalators, or elevators may correspond to an atmospheric pressure change measured by an MS. A stored or measured parameter representing attributes of a user may describe the user as being elderly or disabled. In such a case, associating this attribute of the user and the measured atmospheric pressure change may indicate the user is highly likely to be riding an elevator or escalator as opposed to taking stairs. Accordingly, a list of possible locations indicated by a context parameter map may be modified or narrowed by excluding locations corresponding to stairs and a position or location of the user may thereafter be determined in some embodiments.

In an implementation, a context parameter map may comprise a collection of values corresponding to expected values for particular locations (e.g., grid points) represented by the context parameter map. For example, a context parameter map of an indoor region may comprise a table of particular locations corresponding to expected sensor signature values or other expected parameters or characteristics of the indoor region. Expected sensor signature values may comprise expected values of any of a number of sensor-measurable parameters, such as audio spectra or intensity, light spectra or intensity, temperature, pressure, and so on. Moreover, a context parameter map may include values of any of a number of other expected parameters or characteristics, such as "speed distribution" defined as a likelihood that a person is traveling at a particular speed at a particular location; "sitting probability" defined as a likelihood that a person is sitting versus another activity at a particular location; "occupant age distribution" defined as a likelihood that a person is in one age group versus another age group at a particular location; "purchasing probability" defined as a likelihood that a person is purchasing a product versus another activity at a particular location, and so on. In the latter case, for example, purchasing probability for a location corresponding to a gift shop may be relatively high, whereas purchasing probability for a location corresponding to a hallway may be relatively low. Thus, for example, if a user is making a purchase, which may be detected by the user's MS (e.g., the MS may be used to make such a purchase), then a purchasing probability context parameter map may indicate that there is relatively small likelihood that the user is located in a hallway, and there is relatively high likelihood that the user is located in a gift shop. In another implementation, a user's MS need not detect a purchase. In such a case, a purchasing probability context parameter map may indicate the user is more likely to be in a gift shop than in a hallway in view of a user profile that indicates that a user is a frequent shopper.

In an implementation, a context parameter map may comprise representation values individually corresponding to particular grid points or relatively small areas of a region represented by a map of the region. Such a map may comprise or be expressed as a plurality of electronic signals representative of physical locations of a region and expected values for the physical locations. As mentioned above, representation values may comprise any of a number of types of expected sensor signature values or other parameters or characteristics of an indoor region.

In some implementations, an indoor navigation system may selectively provide assistance information to an MS to facilitate or enable location services. For example, assistance information may be provided to an MS from a local or remote server through wireless communication links. The MS may then locally store received assistance information in a local memory. Such assistance information may include, for example, one or more context parameter maps that may provide expected sensor values associated with particular locations of a region, particularly an indoor region. In an example implementation, a sitting probability context parameter map may include representation values that represent probabilities that a user is located at a particular location among a plurality of locations covered by the context parameter map given that the user is likely sitting. In another example implementation, a context parameter map may include representation values that represent expected sound signatures for a plurality of locations covered by the context parameter map. For example, signals from a microphone on-board an MS may be used to measure ambient sound levels that may be compared to expected sound level values of a sound context parameter map. Such measured sound levels may be used to distinguish among different locations of a building, such as a class room, cafeteria, library, hall way, and so on. In yet another example implementation, a context parameter map may include representation values that represent expected temperatures for a plurality of locations covered by the context parameter map. In still another example implementation, a context parameter map may include representation values that represent expected ambient light levels at a plurality of locations covered by the context parameter map. For example, signals from a photo-sensor on board an MS may be used to measure ambient light levels that may be compared to expected light level values of a light context parameter map. In still another example implementation, a context parameter map may include crowd-density values that represent expected density of people at a plurality of locations covered by the context parameter map. For example, signals responsive to Bluetooth traffic may be used to indicate a number or density of people in a particular location.

As mentioned above, a context parameter map may comprise a table of particular locations corresponding to expected sensor signature values or other expected parameters or characteristics of the indoor region. Such particular locations may be based, at least in part, on grid points laid over locations in an indoor interval at uniform spacing (e.g., two-foot separation of neighboring grid points). Representation values may be provided for individual grid points in metadata organized by rows of a table, for example. In one implementation, a single row may include values for sensor signatures and sensor signature variances (e.g., standard deviation or other uncertainty characteristics of temperature values, ambient light levels values, sound level values, and so on) for associated locations, though claimed subject matter is not limited in this respect. Accordingly, representation values representing expected sensor signature values associated with particular locations may enable an MS to associate sensor signatures with locations in an indoor area. By matching measured sensor signatures, user motion, or user attributes with expected values for a specific location, the location of the MS may be inferred to be at the specific location. In one implementation, individual context parameter maps may correspond to one or more examples described above. For example, there may be a map for each of the sensor measurements described above (e.g., temperature values, ambient light levels values, sound level values, etc.) and/or other measurements or contexts. In another implementation, a context parameter map may correspond to a combination of sensor measurements. For example, a context parameter map may represent an expected signature of a temperature sensor, accelerometer, and microphone at a particular location.

In an implementation, context parameter maps may be generated using any of a number of techniques. In one example technique, computer processes may be used in conjunction with map information or map features to generate context information. In another example technique, human analysis may be used to annotate contextual information. For example, a movie theatre may be annotated by the venue owner to designate where seating areas in the building are located. Such annotations may comprise context data that indicate, with relatively high probability, areas where users tend to be seated. In addition, audio characteristics in those same areas may comprise "movie type", "loudness", and so on. In yet another example technique, mobile device users may collect data using their devices on the fly as they visit particular venues. For example, users may collect various sensor data and correlate this data to a calculated position of the device in a locale. This data may be accumulated and/or used at a single user device, for example for use by the user device, or may be accumulated and/or used across a number of user devices, for example when crowd-sourced. Of course, such techniques are merely examples, and claimed subject matter is not so limited.

In an implementation, two values (e.g., a measured value and an expected signature value) may be considered to "match" if their respective values are the same or within a threshold amount of each other. For example, any measured temperature (e.g., by a sensor of an MS) within a range of 68.0 to 72.0 degrees may be considered to match an expected temperature (e.g., of a heatmap) of 70.0 degrees. Of course, any such threshold or ranges for various types of parameters are possible, and claimed subject matter is not so limited.

In another implementation, instead of determining whether or not a match exists between compared measured sensor values and expected sensor signature values, a weight of comparison may be determined. For example, the closer the values of measured sensor values and expected sensor signature values are to each other, the greater the weight of comparison, which may be expressed by a factor from zero to 1.0. For example, a weight of comparison of 1.0 may indicate an exact match between a measured sensor value and an expected sensor signature value. On the other hand, a relatively low weight of comparison describes a measured sensor value that is not near a value for an expected sensor signature. Of course, such details of a weight of comparison are merely examples, and claimed subject matter is not so limited.

In certain implementations, as shown in FIG. 1, an MS 100 may receive or acquire satellite positioning system (SPS) signals 159 from SPS satellites 160. In some implementations, SPS satellites 160 may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one several regional navigation satellite systems (RNSS') such as, for example, WAAS, EGNOS, QZSS, just to name a few examples.

In addition, the MS 100 may transmit radio signals to, and receive radio signals from, a wireless communication network. In one example, MS 100 may communicate with a cellular communication network by transmitting wireless signals to, or receiving wireless signals from, a base station transceiver 110 over a wireless communication link 123. Similarly, MS 100 may transmit wireless signals to, or receiving wireless signals from a local transceiver 115 over a wireless communication link 125.

In a particular implementation, local transceiver 115 may be configured to communicate with MS 100 at a shorter range over wireless communication link 123 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course, it should be understood that these are merely examples of networks that may communicate with an MS over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of facilitating communication between MS 100 and servers 140, 150 or 155 through local transceiver 115 or base station transceiver 110. In another implementation, network 130 may comprising cellular communication network infrastructure such as, for example, a base station controller or master switching center to facilitate mobile cellular communication with MS 100.

In particular implementations, and as discussed below, MS 100 may have circuitry and processing resources capable of computing a position fix or estimated location of MS 100. For example, MS 100 may compute a position fix based, at least in part, on pseudorange measurements to four or more SPS satellites 160. Here, MS 100 may compute such pseudorange measurements based, at least in part, on pseudonoise code phase detections in signals 159 acquired from four or more SPS satellites 160. In particular implementations, MS 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, MS 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from MS 100 may be measured to three or more of such terrestrial transmitters fixed at known locations based, at least in part, on pilot signals transmitted by the transmitters fixed at known locations and received at MS 100. Here, servers 140, 150 or 155 may be capable of providing positioning assistance data to MS 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, MS 100 may not be capable of acquiring signals 159 from a sufficient number of SPS satellites 160 or perform AFLT or OTDOA to compute a position fix. Alternatively, MS 100 may be capable of computing a position fix based, at least in part, on signals acquired from local transmitters (e.g., femto cells or WLAN access points positioned at known locations). For example, MSs may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, MS 100 may obtain an indoor position fix by applying characteristics of acquired signals to a radio context parameter map indicating expected RSSI or RTT values at particular locations in an indoor area.

In particular implementations, MS 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio context parameter maps, locations and identities of transmitters, routeability graphs, just to name a few examples. Other assistance data received by the MS may include, for example, local maps of indoor areas for display or to aid in navigation. Such a map may be provided to MS 100 as MS 100 enters a particular indoor area. Such a map may show indoor features such as doors, hallways, entry ways, walls, etc., points of interest such as bathrooms, pay phones, room names, stores, etc. By obtaining and displaying such a map, an MS may overlay a current location of the MS (and user) over the displayed map.

In one implementation, a routeability graph and/or digital map may assist MS 100 in defining feasible areas for navigation within an indoor area and subject to physical obstructions (e.g., walls) and passage ways (e.g., doorways in walls). Here, by defining feasible areas for navigation, MS 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular implementation, MS 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of MS 100.

According to an implementation, MS 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at MS 100 and data transmission resources may make receipt of indoor navigation assistance data for all areas served by servers 140, 150 or 155 impractical or infeasible, a request for indoor navigation assistance data from MS 100 may indicate a rough or course estimate of a location of MS 100. MS 100 may then be provided indoor navigation assistance data covering areas including and/or proximate to the rough or course estimate of the location of MS 100. In some embodiments, one or more positioning techniques, for example probabilistic positioning or other techniques, may be used in association with one or more context maps to determine a position of the MS 100. For example, methods that may be used with RSSI representations of a wireless environment—which may be referred to as "heatmaps" in some contexts—may be applied to sensor measurements and/or sensor signatures and/or sensor signals (or context or social data) as represented by one or more context maps. In some embodiments, one or more filters described below, for example a particle filter, may be used with the data described above to perform such positioning.

In one particular implementation, a request for indoor navigation assistance data from MS 100 may specify a location identifier (LCI). Such an LCI may be associated with a locally defined area such as, for example, a particular floor of a building or other indoor area which is not mapped according to a global coordinate system. In one example server architecture, upon entry of an area, MS 100 may request a first server, such as server 140, to provide one or more LCIs covering the area or adjacent areas. Here, the request from the MS 100 may include a rough location of MS 100 such that the requested server may associate the rough location with areas covered by known LCIs, and then transmit those LCIs to MS 100. MS 100 may then use the received LCIs in subsequent messages with a different server, such as server 150, for obtaining navigation assistance relevant to an area identifiable by one or more of the LCIs as discussed above (e.g., digital maps, locations and identifies of beacon transmitters, radio context parameter maps or routeability graphs). In an embodiment, an MS, such as 100, need not communicate wirelessly to perform techniques described above. For example, a context parameter map may be pre-loaded onto an MS or loaded using a memory card or wire-line connection. Sensors may be used to estimate the location of such an MS without wireless communication. Claimed subject matter is not limited to wired or wireless communication, but some embodiments may include wired or wireless communication, or a device enabled for such communication.

In certain implementations, an MS may receive one or more context parameter maps from a server via wireless communication. For example, a request for indoor navigation assistance data from MS 100 may specify an LCI, as mentioned above. Though a plurality of context parameter maps may be available to an MS, the MS may discriminately download selected context parameter maps based, at least in part, on sensing capabilities of the MS. For example, an MS need not download a temperature context parameter map from a server if the MS does not include a temperature sensor. An MS may also discriminately download selected context parameter maps based, at least in part, on expected energy consumption and accuracy of a particular sensor of the MS, wherein the particular sensor corresponds to one or more parameters included in the context parameter map. Thus, an MS may consider energy-accuracy tradeoffs in determining whether to download a particular context parameter map. Such tradeoffs, for example, may depend, at least in part, on sensors involved with particular context parameter maps or discriminative ability of particular context parameter maps. For example, temperature may have a relatively low energy cost (e.g., processing time or battery usage) or relatively low variation across an indoor region. Because of such relatively low variation, temperature may be a poor choice of representation parameter for positioning. Because of such relatively low energy cost, however, temperature may be a desirable choice of representation parameter for positioning.

In some embodiments, a cost function may be stored in a memory of an MS to allow the MS to determine a tradeoff between energy consumption and accuracy optimizations. In some embodiments, metadata associated with a context parameter map may enable a positioning engine of an MS to determine which context parameter map to use. Further, depending on the sensing capabilities of the MS or on contextual information, one or more context parameter maps may be pruned to omit information which cannot be discriminated. For example, if an MS is utilizing a particle filter and all particles are distributed within an area where ambient light is relatively similar, ambient light input may be ignored by the filter or pruned from a context parameter map. The amount of information to be downloaded in any given context parameter map or which context parameter maps to download may be determined by sensing capabilities of the MS and/or based on connection speed, cost of downloading, and/or network parameters. For example, an MS may determine expected gains associated with one or more context parameter maps and compare such gains against network or monetary costs of downloading the context parameter map(s) to determine which context parameter map(s) to download.

Figure 2:
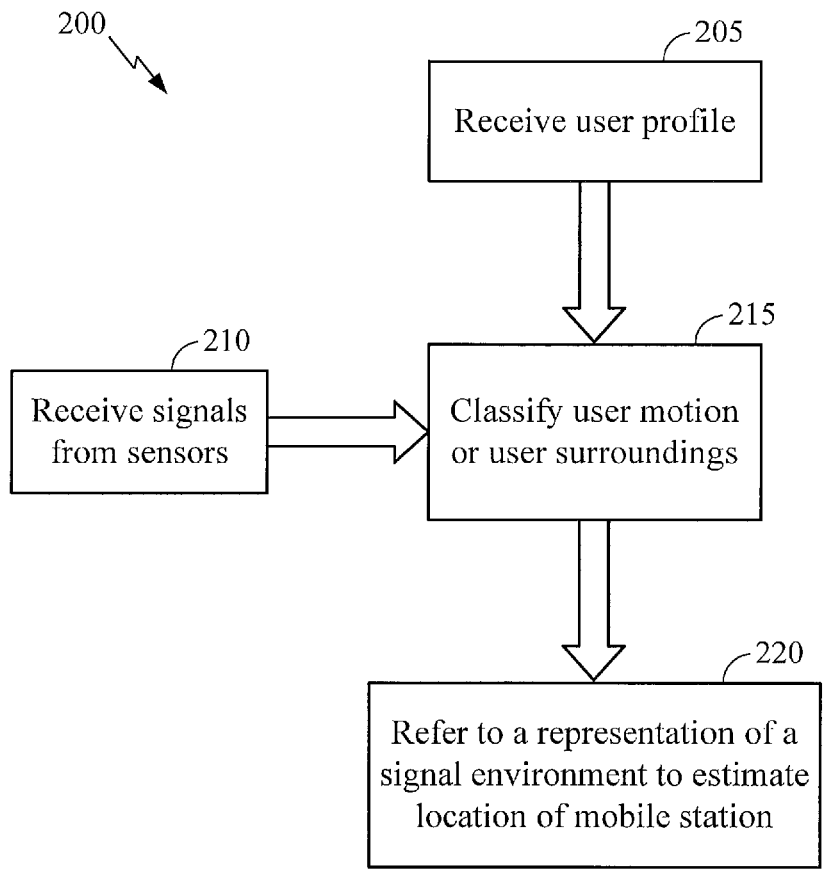
FIG. 2 is a flow diagram illustrating a process for estimating a location of a mobile station, according to an implementation.

FIG. 2 is a flow diagram illustrating a process 200 for estimating a location of a user co-located with an MS in a region covered by a context parameter map, according to an implementation. Process 200 may be implemented in one or more land-based computing platforms or an MS. For example, process 200 may be used to estimate a location of an MS in a region of a shopping mall or a building, such as a building shown in FIG. 3, though claimed subject matter is not so limited. For example, process 200 may be used to determine a location of a user in an outdoor area or other area covered by a context parameter map.

At block 205, a user profile may be received from any of a number of possible sources. For example, such a user profile may comprise information stored in memory onboard an MS regarding a user of the MS. In one example, information regarding the user, such as daily movement patterns (e.g., as detected by an onboard accelerometer) may be automatically (e.g., without action by the user) recorded by the MS. In another example, a user may, at some time, provide information regarding personal characteristics, such as age, shopping preferences, shopping history, club memberships, blog subscriptions, and so on, into an MS. For instance, upon or after purchasing an MS, the user may use the MS to fill out a questionnaire which may, at least in part, populate a user profile maintained by the MS. In yet another example, a user profile may be provided by a Web service on the Internet. In one particular implementation, an MS may wirelessly communicate with a land-based server to request a user profile corresponding to, for example, a MAC ID of the MS, though claimed subject matter is not so limited.

As mentioned above, user attributes may comprise social or personal characteristics of the user, such as a user's age, sex, occupation, buying behavior, product consumption, club or group association, daily habits (e.g., time of day or duration that a user takes a lunch break, etc.), and so on. A state of a user may comprise any of a number of parameters of motion of the user, such as the user's speed, direction of travel, shape of trajectory, elevation change, etc. Such parameters of motion may be detected or inferred using, for example, signals received from sensors onboard an MS, such as at block 210. Such sensors may comprise inertial sensors (e.g., accelerometer, gyroscope, magnetometer, etc.), a proximity sensor, a temperature sensor, a compass, a gravitometer, or an audio sensor, just to name a few examples. Such sensors may generate signals responsive to characteristics of the surroundings of a user co-located with an MS or responsive to movements of the user. Accordingly, at block 215, parameters of motion of a user may be determined based, at least in part, on such signals, for example. Such parameters of motion may be used to classify a motion of the user (e.g., sitting, walking, running, moving in a substantially straight line, changing elevation, and so on). Signals generated from sensors may also be used to classify characteristics of the surroundings of the user (e.g., ambient sound or light characteristics, and so on).

In an implementation, as discussed above, a location of a user co-located with an MS may be estimated based, at least in part, on one or more attributes of the user, a sensor measurement value based, at least in part, on a signal from at least one sensor on the MS, and a context parameter map database. Accordingly, at block 220, expected signature values of a context parameter map may be compared to corresponding values measured by sensors on the MS. Such a comparison may lead to a list of one or more possible locations of the MS. Further, the user profile of block 205 may be utilized to narrow the list of possible locations. For example, one or more sensors on an MS may indicate that a user co-located with the MS is located either in a cubicle area of an office building or in a classroom of a college. A user profile may be utilized to determine which of these two possible locations the user is most likely located. For example, a user profile may include the occupation of the user. A likelihood that the user is located in the cubicle area may be ruled out (or reduced) if the user is a student, for example. Further, a likelihood that the user is located in the classroom may be considered relatively high if the user's profile indicates a course schedule of the user. Of course, such details of process 200 are merely examples, and claimed subject matter is not so limited. For example, a context parameter map may be downloaded by the MS for a particular locale or LCI, and the context parameter map used by the MS to determine where in the locale or LCI the MS (and/or user of that MS) is located. Thus, rather than discriminating between separate locations based on social context, the context heatmap maybe used to determine a location or position within a particular area in which a device is located based on one or more sensor (or social data or context) measurements.

FIGS. 3A, 3B, 3C, and 3D show four example maps of a floor 310 of a building, according to an implementation. The maps include expected signature values of parameters, such as probability (e.g., sitting probability), expected light spectra, or expected sound spectra, for particular locations of the maps, as described below. In an implementation, a context parameter map may comprise such values of parameters corresponding to particular locations. Different context parameter maps may include different expected signature values. For example, a sitting probability context parameter map may include expected sitting probabilities for a number of particular locations of the context parameter map. A context parameter map may comprise a plurality of electronic signals representative of physical locations of a region and expected signature values corresponding to the physical locations. Context parameter maps may comprise scalar maps of temperature, lighting, pressure, and so on, which may be sensed by an MS, for example. Context parameter maps may also comprise vector maps of features derived from audio or image data processed on an MS, for example. Context parameter maps may further comprise a map of crowd density estimated using Bluetooth traffic, or a map of social characteristics such as age obtained from MS profiles (e.g., cellular phone profiles).

In a particular example, in FIG. 3A, representation of signal environment 301 may comprise a probability context parameter map of a floor 310 of an office building. Several regions 312 (among more such regions that are not shown for clarity) may indicate particular ranges of probability, which may vary within such regions, for example. In one implementation, for example, such probability may comprise sitting probability. As mentioned above, sitting probability may be defined as a likelihood that a person is sitting versus another activity at a particular location. Accordingly, representation of signal environment 301 may include sitting probabilities for various locations (e.g., grid points) of the floor.

In another example, in FIG. 3B, representation of signal environment 302 may comprise an ambient light power spectra context parameter map comprising expected ambient light power spectra for various regions or locations (e.g., grid points) of floor 310. For example, sunlight may have a relatively wide power spectrum, whereas fluorescent lights may have a relatively narrow power spectrum. To illustrate a few examples, region 320 may correspond to one particular expected ambient light power spectrum while region 322 may correspond to another particular expected ambient light power spectrum, and so on. In one case, for example, a particular type of fluorescent office lighting may be present in region 320, while another type of office lighting may be present in region 322. In a particular example, regions 324 or 326 of floor 310 near windows may be exposed to sunlight having a particular power spectrum. Accordingly, expected ambient light power spectra for such regions may comprise a mixture of a power spectrum of sunlight plus a power spectrum of indoor lighting. On the other hand, regions 322 of floor 310 away from windows may be exposed only to indoor lighting. Accordingly, expected ambient light power spectra for such regions may comprise a power spectrum of indoor lighting.

In an implementation, values of a context parameter map may be cyclically time-dependent so that such values may change based, at least in part, on time of day or day of week, and so on. For example, the ambient light power spectra context parameter map described above may comprise values that cyclically vary during a 24-hour period. In this way, an ambient light power spectra context parameter map may account for whether sunny or night-time conditions exist outside windows of floor 310. For example, regions near windows may be exposed to sunlight having a particular power spectrum only during daylight hours. Accordingly, expected ambient light spectra for such regions may comprise a power spectrum of sunlight plus a power spectrum of indoor lighting during daylight hours, while expected ambient light power spectra for such regions during night-time may comprise merely a power spectrum of indoor lighting. Of course, values for types of context parameter maps other than that of the ambient light power spectra context parameter map described above may cyclically vary, and claimed subject matter is not limited in this respect.

In yet another example of a context parameter map, shown in FIG. 3C, representation of signal environment 303 may comprise an ambient sound context parameter map comprising a map of floor 310 including expected ambient sound signatures for various locations (e.g., grid points) of the floor. In one implementation, ambient sound may comprise a value of integration across a relatively wide frequency spectrum (e.g., sound volume) of sound measured by a microphone onboard an MS. In another implementation, ambient sound may comprise a sound signature resulting from digital signal processing in the frequency domain of the power spectrum of sound measured from a microphone onboard an MS. Accordingly, for example, a sound signature of a crowd of people may be distinguishable from a sound signature of clanking dishes or office sounds. To illustrate a few examples, region 330 may correspond to one particular expected ambient sound signature while region 332 may correspond to another particular expected ambient sound signature, and so on. In one case, for example, region 336 may comprise an office area having one particular ambient sound signature. In another case, for example, region 334 may comprise a break-room-eating area having another particular ambient sound signature.

Figure 3E:
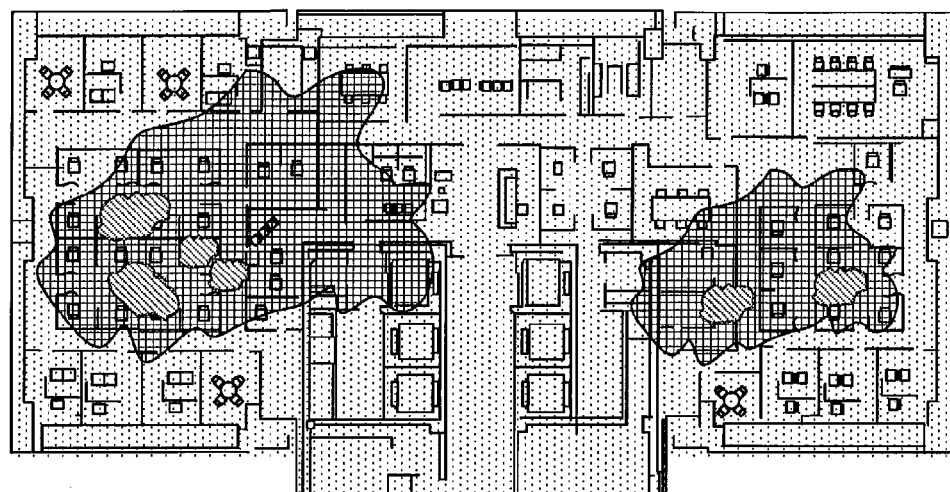
Figure 3E:
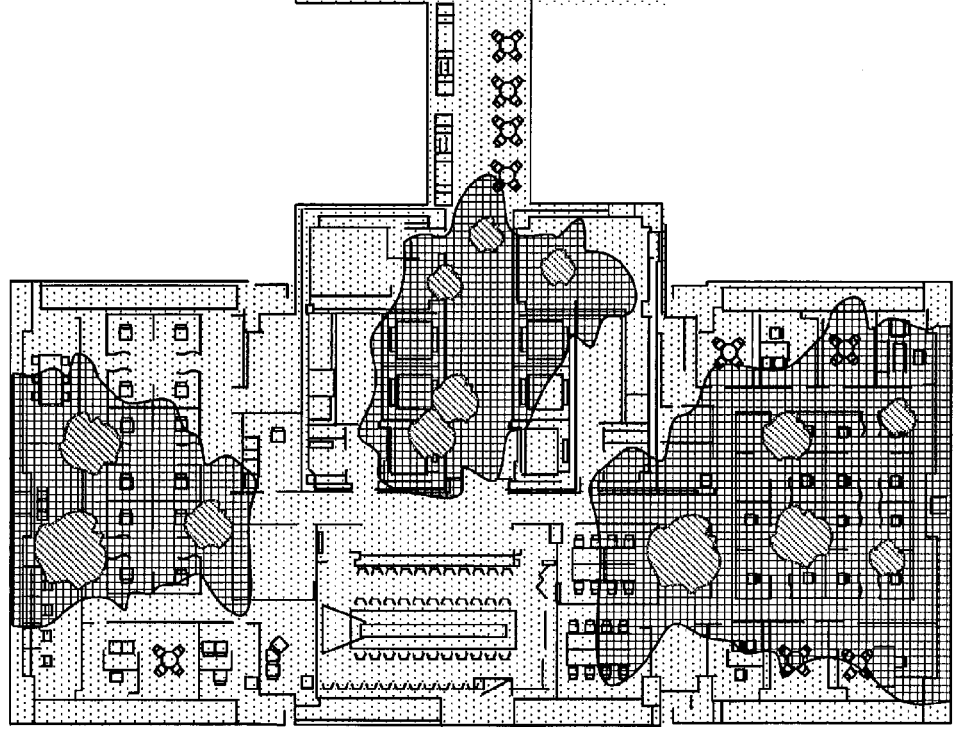
Figure 3E:
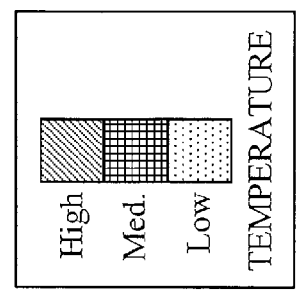

In yet another example of a context parameter map, shown in FIG. 3D, representation of signal environment 304 may comprise a temperature context parameter map of floor 310 of an office building. Temperature may vary in different areas of floor 310. For example, several regions 342 (among more such regions that are not shown for clarity) may indicate particular ranges of temperature, which may vary within such regions, for example. Accordingly, representation of signal environment 304 may include temperature values for various locations (e.g., grid points) of the floor. FIG. 3E shows a temperature context parameter map of a floor of a data center. In FIG. 3E, the map has a finer granularity than in FIG. 3D. In FIG. 3E, different shadings represent different temperature ranges, or different temperature ranges relative to temperature ranges of other areas of the floor. As seen in the legend on the right sight of FIG. 3E, one shade represents a higher temperature, whereas another shade represents a lower temperature, for example.

In an implementation, as explained above, values of a context parameter map may be cyclically time-dependent so that such values may change based, at least in part, on time of day or day of week, and so on. For example, the ambient sound signature context parameter map described above may comprise signatures that cyclically vary during a 24-hour period. In this way, an ambient sound context parameter map may account for whether office workers are active at their desks or meeting in a break-room. Of course, values for types of context parameter maps other than that of the ambient sound context parameter map described above may cyclically vary, and claimed subject matter is not limited in this respect.

Figure 4:
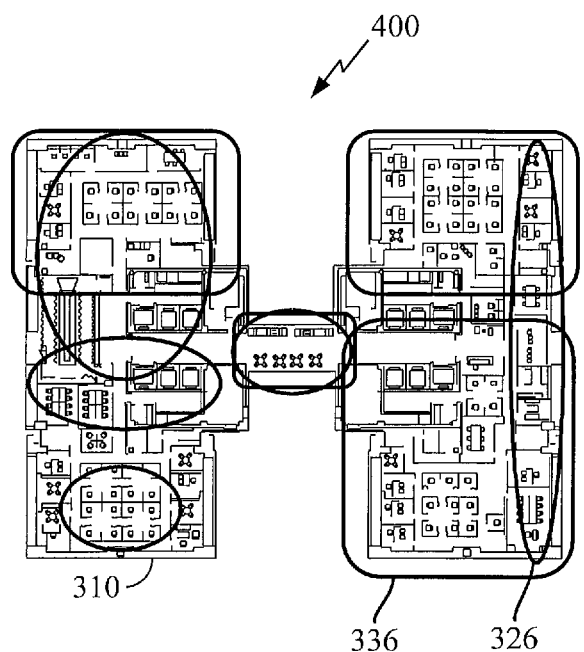
FIG. 4 shows a context parameter map comprising a combination of various types of context parameter maps for a floor of a building, according to an implementation.

In one implementation, a context parameter map may comprise a table of particular locations corresponding to more than one type of expected sensor signature value or more than one type of other expected parameters or characteristics of an indoor region. For example, a context parameter map may associate particular locations with age-groups and ambient light levels, for example. FIG. 4 shows a representation of signal environment 400 comprising a combination of more than one type of expected sensor signature or other expected parameters or characteristics for floor 310 of a building, according to an implementation. As explained above, an indoor navigation system may selectively provide assistance information to an MS to facilitate and/or enable location services. Such assistance information may include, for example, context parameter maps that may be used for positioning based, at least in part, on one or more types of expected signature values of a region, particularly an indoor region. In an implementation, a context parameter map may comprise a collection of context parameter map values for any number of expected measurable parameters corresponding to particular locations represented by the context parameter map. For example, FIGS. 3A, 3B, 3C, and 3D show four examples of context parameter maps individually involving sitting probability, expected ambient light spectra, and expected ambient sound level, respectively. FIG. 4, however, shows an example of a context parameter map simultaneously including values for sitting probabilities, expected ambient light spectra, and expected ambient sound levels for various locations (e.g., grid points) of the floor. For example, representation of signal environment 400 may include region 326 of floor 310 having a particular expected light spectrum and region 336 having relatively low expected ambient sound levels, and so on. Accordingly, values of a context parameter map simultaneously including multiple types of expected signature values of an indoor region associated with particular locations may enable an MS to associate sensor measurements or other parameters or characteristics with locations in an indoor area. Such context parameter maps may enable MS positioning with greater accuracy compared to a context parameter map indicating merely a single type of expected signature values, for example.

In an implementation, in addition to expected sensor signature values, a context parameter map may simultaneously comprise a collection of representation values for any number of expected user profile parameters corresponding to particular locations represented by the context parameter map. For example, a context parameter map may simultaneously include expected user-age signatures, expected user-occupation signatures, and expected user-membership signatures. Expected user-age signatures may comprise a probability distribution of user ages or user age groups for particular locations covered by a context parameter map. For example, for one particular location there may be ten percent probability that the age of a user in the particular location is between 21.0 and 30.0, whereas there may be one percent probability that the age of a user in the particular location is between 5.0 and 10.0. Such a particular location may comprise a drinking bar, for example. Expected user-occupation signatures may comprise a probability distribution of user occupations for particular locations covered by a context parameter map. For example, for one particular location there may be a sixty percent probability that the occupation of a user in the particular location is a software engineer, whereas there may be a two percent probability that the occupation of a user in the particular location is a marine biologist. Such a particular location may comprise a cubicle region of an office building, for example. Expected user-membership signatures may comprise a probability distribution of user memberships (e.g., a likelihood that a user is a member of one group versus another group) for particular locations covered by a context parameter map. For example, for one particular location there may be an eighty percent probability that a user in the particular location is a member of a frequent flier club, whereas there may be a ten percent probability that the user in the particular location is a member of a ski club. Such a particular location may comprise a waiting area of an airport, for example. Accordingly, values of a context parameter map simultaneously including multiple types of expected user profile parameters corresponding to particular locations represented by the context parameter map may enable an MS to associate the expected user profile parameters with locations in an indoor area. For example, a context parameter map may associate stored classified user motion with particular locations.

Figure 5:
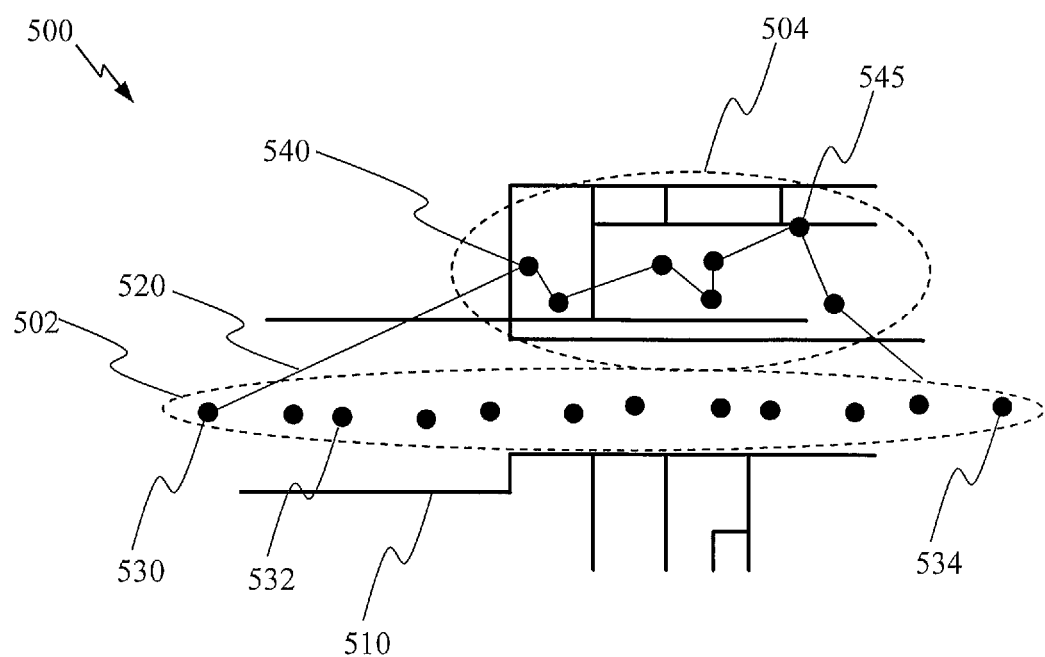
FIG. 5 is a map of a portion of a building showing various trajectories, according to an implementation.

FIG. 5 is a map 500 of a portion of a building showing various trajectories of a user co-located with an MS, according to an implementation. Dots, such as 540 and 545, included in dashed ellipse 504 may indicate locations of position fixes of the MS based, at least in part, on a context parameter map involving a single type of expected sensor signature or other parameter or characteristic of an indoor region. Considering merely a single expected sensor signature (e.g., sound spectrum) may erroneously place a user in walls or closet spaces. For example, trajectory 520 indicates that a user co-located with an MS travels erratically through walls into small rooms or closet spaces, and so on. On the other hand, by considering additional expected sensor signatures, improved positioning accuracy may be achieved. For example, by considering a walking speed of a user in addition to considering ambient sound levels, it may be determined more likely that a user is located in a hallway rather than a closet. Accordingly, dots, such as 530, 532, and 534, included in dashed ellipse 502 may indicate locations of position fixes of the MS based, at least in part, on a context parameter map simultaneously involving multiple types of sensor signatures or other parameters or characteristics of an indoor region. For example, such position fixes indicate that a user co-located with an MS travels within bounds (e.g., walls) of a hallway 510.

Accordingly, by using a "shape" of a trajectory and speed of motion, positioning accuracy may be improved. Trajectory data may be obtained from WiFi position fixes or inertial sensors, for example. In cases where WiFi positioning is relatively inaccurate (such as in the example described with FIG. 5), the positioning may be reliable for estimating an approximate local speed and some trajectory shape parameters, for example.

Figure 6:
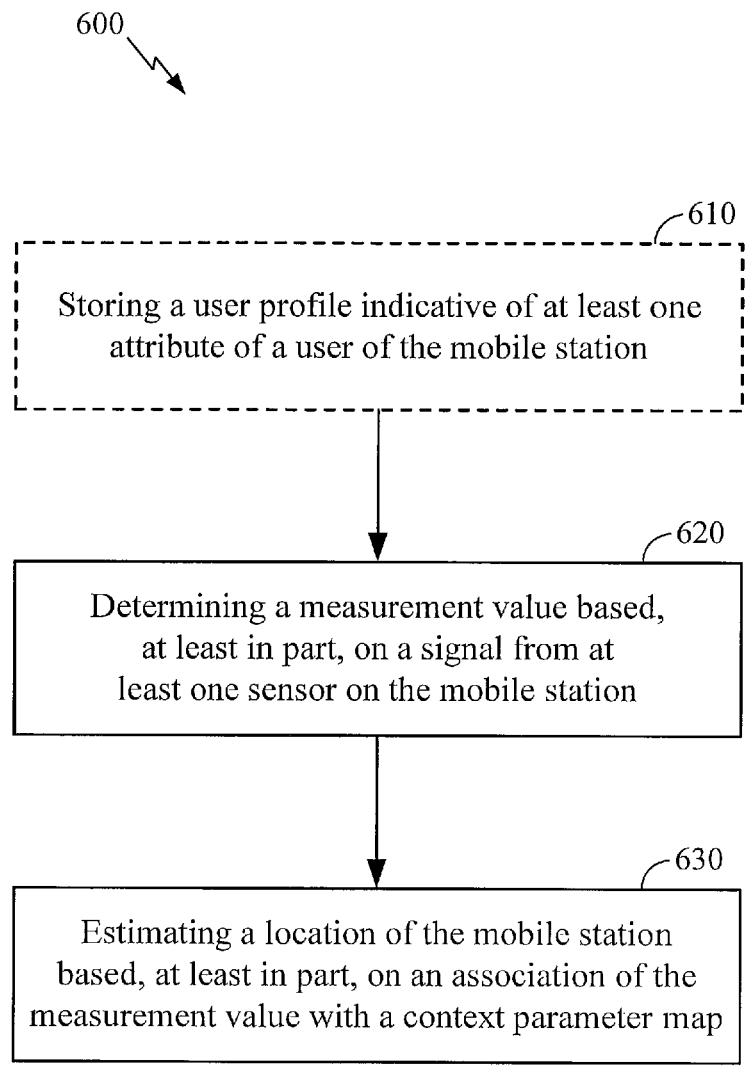
FIG. 6 is a flow diagram illustrating a process for estimating a location of a mobile station, according to an implementation.

FIG. 6 is a flow diagram illustrating a process 600 for estimating a location of an MS, according to an implementation. Process 600 may be performed by an MS, such as MS 100, or a server, such as 140, shown in FIG. 1, for example. Optionally, at block 610, a user profile indicative of at least one attribute of a user of an MS may be stored, such as in a memory device located at the MS or a server. For example, such attributes of a user may comprise age, occupation, club memberships, and so on. In addition, one or more sensors may be used to infer user motion patterns (e.g., sitting, standing, or moving). In an implementation, an MS may include inertial sensors (e.g., accelerometer, gyroscope, magnetometer, etc.), a proximity sensor, a temperature sensor, a compass, a gravitometer, or an audio sensor, just to name a few examples. Such sensors may generate signals responsive to movements of a user co-located with the MS. These signals may be processed to determine a state of motion of the user. In some embodiments, block 610 is omitted. At block 620, a measurement value may be determined based, at least in part, on a signal from at least one sensor on the MS. At block 630, a location of the MS may be estimated based, at least in part, on an association of the measurement value with a context parameter map. In one particular implementation, values of a context parameter map may be cyclically time-dependent. For example, values of a context parameter map database may vary based, at least in part, on time of day, day of week, day of year, and so on. Of course, such details of process 600 are merely examples, and claimed subject matter is not so limited. For example, at block 630, a location of the MS may be estimated based, at least in part, on an association of the at least one attribute and the measurement value with a context parameter map, for example when the user profile is stored at block 610.

Figure 7:
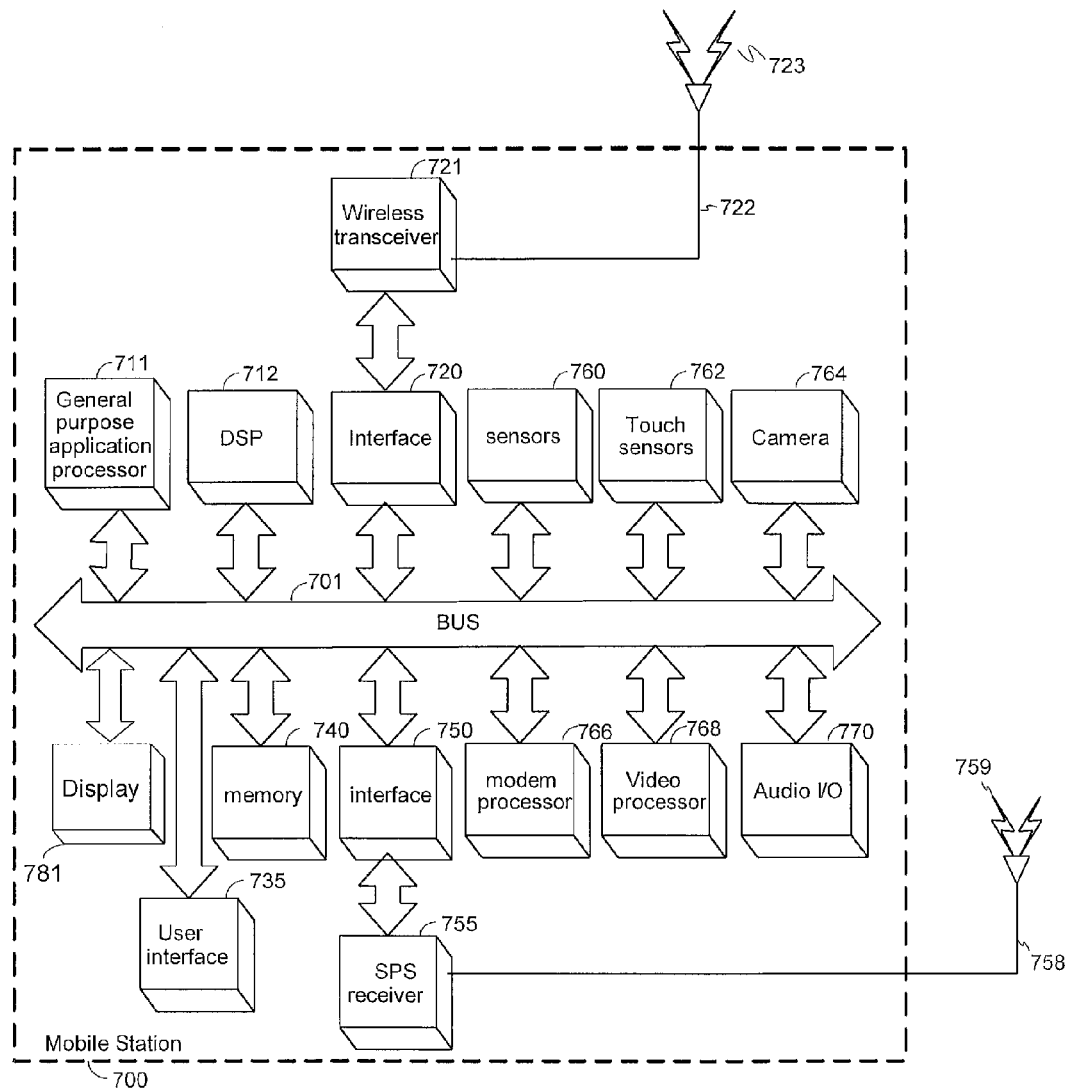
FIG. 7 is a schematic block diagram illustrating an exemplary mobile station, in accordance with an implementation.

FIG. 7 is a schematic diagram of an MS according to an implementation. MS 700 may comprise one or more features of MS 100 shown in FIG. 1, for example. In certain embodiments, processes such as 200 or 600, for example, may be implemented using elements included in MS 700. In other embodiments, MS 700 may provide a means for determining a measurement value based, at least in part, on a signal from at least one sensor on a mobile station, and means for estimating a location of the mobile station based, at least in part, on an association of the measurement value with a context parameter map. For example, one or more of the means recited above may be implemented by one or more of elements 711, 712, 721, 740, and/or 766, which will now be described in greater detail.

In certain implementations, MS 700 may comprise a wireless transceiver 721 which is capable of transmitting and receiving wireless signals 723 via an antenna 722 over a wireless communication network, such as over a wireless communication link 123, shown in FIG. 1, for example. Wireless transceiver 721 may be connected to bus 701 by a wireless transceiver bus interface 720. Wireless transceiver bus interface 720 may, in some implementations be at least partially integrated with wireless transceiver 721. Some implementations may include multiple wireless transceivers 721 and wireless antennas 722 to enable transmitting and/or receiving signals according to a corresponding multiple wireless communication standards such as, for example, WiFi, CDMA, WCDMA, LTE and Bluetooth, just to name a few examples.

MS 700 may also comprise SPS receiver 755 capable of receiving and acquiring SPS signals 759 via SPS antenna 758. SPS receiver 755 may also process, in whole or in part, acquired SPS signals 759 for estimating a location of MS 700. In some implementations, general-purpose processor(s) 711, memory 740, DSP(s) 712 and/or specialized processors (not shown) may also be utilized to process acquired SPS signals, in whole or in part, and/or calculate an estimated location of MS 700, in conjunction with SPS receiver 755. Storage of SPS or other signals for use in performing positioning operations may be performed in memory 740 or registers (not shown).

Also shown in FIG. 7, MS 700 may comprise digital signal processor(s) (DSP(s)) 712 connected to the bus 701 by a bus interface 710, general-purpose processor(s) 711 connected to the bus 701 by a bus interface 710 and memory 740. Bus interface 710 may be integrated with the DSP(s) 712, general-purpose processor(s) 711 and memory 740. In various implementations, functions or processes, such as processes 200 or 600 shown in FIGS. 2 and 6, for example, may be performed in response to execution of one or more machine-readable instructions stored in memory 740 such as on a computer-readable storage medium, such as RAM, ROM, FLASH, or disc drive, just to name a few example. The one or more instructions may be executable by general-purpose processor(s) 711, specialized processors, or DSP(s) 712. In one implementation, for example, one or more machine-readable instructions stored in memory 740 may be executable by a processor(s) 711 to: store a user profile indicative of at least one attribute of a user of an MS; receive a measurement value based, at least in part, on a signal from at least one sensor on the MS; and estimate a location of the MS based, at least in part, on an association of the at least one attribute and the measurement value with a context parameter map database. Memory 740 may comprise a non-transitory processor-readable memory and/or a computer-readable memory that stores software code (programming code, instructions, etc.) that are executable by processor(s) 711 and/or DSP(s) 712 to perform functions described herein.

Also shown in FIG. 7, a user interface 735 may comprise any one of several devices such as, for example, a speaker, microphone, display device, vibration device, keyboard, touch screen, just to name a few examples. In a particular implementation, user interface 735 may enable a user to interact with one or more applications hosted on MS 700. For example, devices of user interface 735 may store analog or digital signals on memory 740 to be further processed by DSP(s) 712 or general purpose processor 711 in response to action from a user. Similarly, applications hosted on MS 700 may store analog or digital signals on memory 740 to present an output signal to a user. In another implementation, MS 700 may optionally include a dedicated audio input/output (I/O) device 770 comprising, for example, a dedicated speaker, microphone, digital to analog circuitry, analog to digital circuitry, amplifiers and/or gain control. It should be understood, however, that this is merely an example of how an audio I/O may be implemented in an MS, and that claimed subject matter is not limited in this respect. In another implementation, MS 700 may comprise touch sensors 762 responsive to touching or pressure on a keyboard or touch screen device.

MS 700 may also comprise a dedicated camera device 764 for capturing still or moving imagery. Camera device 764 may be used as an environmental sensor, for example. Camera device 764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 711 or DSP(s) 712. Alternatively, a dedicated video processor 768 may perform conditioning, encoding, compression or manipulation of signals representing captured images. Additionally, video processor 768 may decode/decompress stored image data for presentation on a display device 781 on MS 700.

MS 700 may also comprise sensors 760 coupled to bus 701 which may include, for example, inertial sensors and environment sensors that may be used for determining measurement values, as described above. Inertial sensors of sensors 760 may comprise, for example accelerometers (e.g., collectively responding to acceleration of MS 700 in three dimensions), one or more gyroscopes or one or more magnetometers (e.g., to support one or more compass applications). Environment sensors of MS 700 may comprise, for example, temperature sensors, barometric pressure sensors, ambient light sensors, camera imagers, and microphones, just to name few examples. Sensors 760 may generate analog or digital signals that may be stored in memory 740 and processed by DPS(s) or general purpose processor 711 in support of one or more applications such as, for example, applications directed to positioning or navigation operations.

In an implementation, inertial sensors and/or environment sensors may be used for determining measurement values, as described above. For example, measurements from inertial sensors may be used to determine an activity state of a user, such as sitting, standing, walking, and so on. In another example, moving average speed may be calculated using measurements from inertial sensors or from position fixes. In another example, turn-rate, e.g., a moving average of orientation change, may be calculated using measurements from inertial sensors during a fixed window of time. In yet another example, displacement, e.g., a distance between position fixes separated by a relatively long time interval may also be calculated using measurements from inertial sensors during a fixed window of time. In still another example, a shape of a path or trajectory may be determined by calculating dimensions of a bounding box around position fixes over a fixed time interval.

In a particular implementation, MS 700 may comprise a dedicated modem processor 766 capable of performing baseband processing of signals received and downconverted at wireless transceiver 721 or SPS receiver 755. Similarly, modem processor 766 may perform baseband processing of signals to be upconverted for transmission by wireless transceiver 721. In alternative implementations, instead of having a dedicated modem processor, baseband processing may be performed by a general purpose processor or DSP (e.g., general purpose/application processor 711 or DSP(s) 712). As illustrated, an interface 750 may be coupled to applicable components of mobile device 700, such as bus 701 or SPS receiver 755. It should be understood, however, that these are merely examples of structures that may perform baseband processing, and that claimed subject matter is not limited in this respect.

Figure 8:
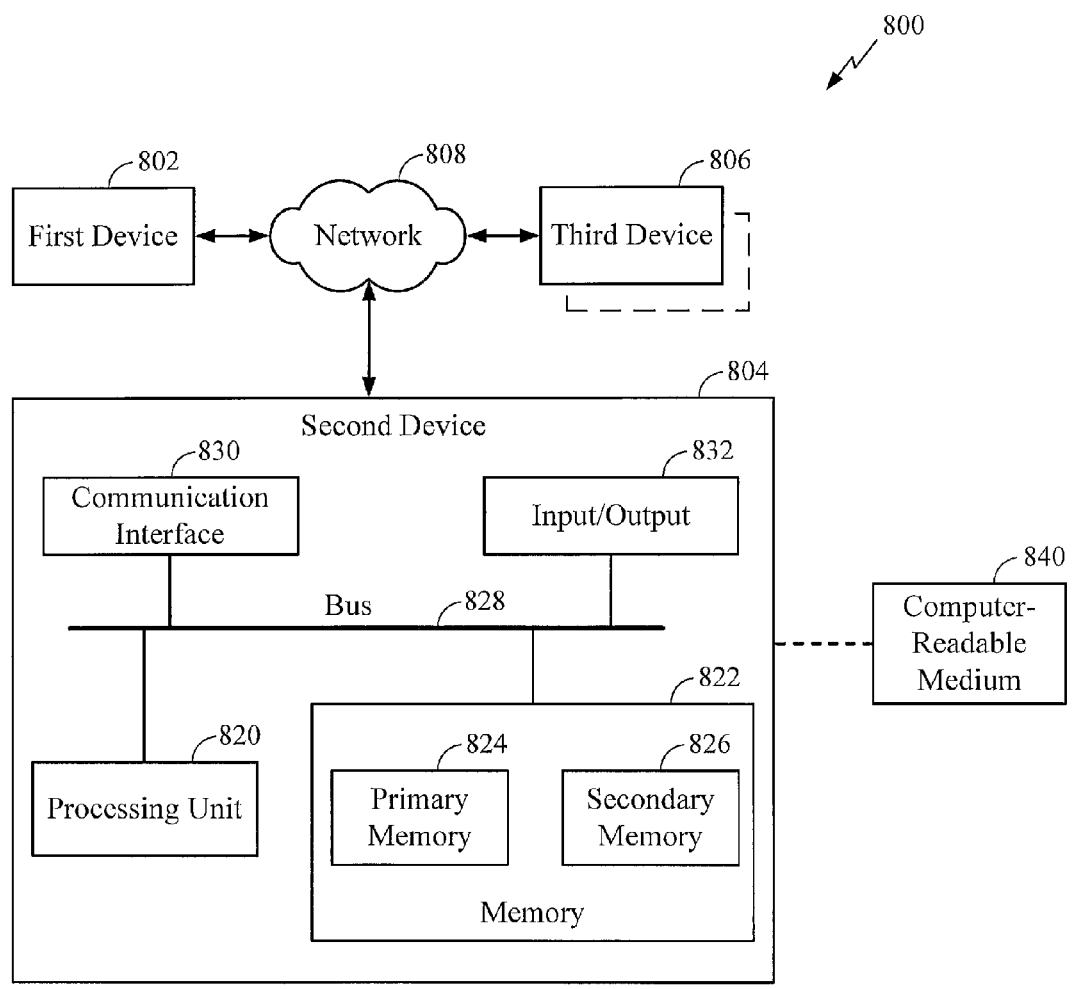
FIG. 8 is a schematic block diagram of an example computing platform.

FIG. 8 is a schematic diagram illustrating an example system 800 that may include one or more devices configurable to implement techniques or processes, such as process 200 described above, for example, in connection with FIG. 2. System 800 may include, for example, a first device 802, a second device 804, and a third device 806, which may be operatively coupled together through a wireless communications network 808. In an aspect, first device 802 may comprise a server capable of providing positioning assistance data such as, for example, a "context parameter map" or a base station almanac. First device 802 may also comprise a server capable of providing an LCI to a requesting MS based, at least in part, on a rough estimate of a location of the requesting MS. First device 802 may also comprise a server capable of providing indoor positioning assistance data relevant to a location of an LCI specified in a request from an MS. Second and third devices 804 and 806 may comprise MSs, in an aspect. Also, in an aspect, wireless communications network 808 may comprise one or more wireless access points, for example. However, claimed subject matter is not limited in scope in these respects.

First device 802, second device 804 and third device 806, as shown in FIG. 8, may be representative of any device, appliance or machine that may be configurable to exchange data over wireless communications network 808. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 802, 804, and 806, respectively, may comprise one or more of a base station almanac server, a base station, or an MS in accordance with the examples described herein.

Similarly, wireless communications network 808, as shown in FIG. 8, is representative of one or more communication links, processes, or resources configurable to support the exchange of data between at least two of first device 802, second device 804, and third device 806. By way of example but not limitation, wireless communications network 808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to wireless communications network 808.

It is recognized that all or part of the various devices and networks shown in system 800, and the processes and methods as further described herein, may be implemented using or otherwise including hardware, firmware, software, or any combination thereof. Thus, by way of example but not limitation, second device 804 may include at least one processing unit 820 that is operatively coupled to a memory 822 through a bus 828. In one implementation, for example, one or more machine-readable instructions stored in memory 822 may be executable by processing unit 820 to generate context parameter maps or to determine a measurement value based, at least in part, on a signal from a sensor, and to estimate a location of a mobile station based, at least in part, on an association of the measurement value with the representation of the signal environment.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any non-transitory medium that can carry or make accessible data, code or instructions for one or more of the devices in system 800. Computer-readable medium 840 may also be referred to as a storage medium.

Second device 804 may include, for example, a communication interface 830 that provides for or otherwise supports the operative coupling of second device 804 to at least wireless communications network 808. By way of example but not limitation, communication interface 830 may include a network interface device or card, a modem, a router, a switch, a transceiver, and the like.

Second device 804 may include, for example, an input/output device 832. Input/output device 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more MSs may communicate with a femto cell via a code division multiple access ("CDMA") cellular communication protocol, for example, and the femto cell may provide the MS access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile station:
   determining a measurement value based, at least in part, on a signal from at least one sensor on said mobile station;
   selectively downloading a context parameter map from a server, said context parameter map being selected for downloading based, at least in part, on expected energy consumption and accuracy of a particular sensor of said mobile station, wherein measurements from said particular sensor correspond to one or more parameters included in said context parameter map, and
   estimating a location of said mobile station based, at least in part, on an association of said measurement value with said context parameter map.

2. The method of claim 1, wherein said context parameter map comprises a combined context parameter map including at least a first context parameter map associating user attributes with a first set of particular locations and a second context parameter map associating a first type of sensor measurements with a second set of particular locations.

3. The method of claim 2, wherein said combined context parameter map further comprises a third context parameter map associating a second type of sensor measurements with a third set of particular locations.

4. The method of claim 2, further comprising storing a user profile indicative of at least one attribute of a user of the mobile station.

5. The method of claim 4, wherein said at least one attribute of said user comprises age, occupation, shopping preferences, or club membership.

6. The method of claim 2, wherein said first context parameter map associates an age, an occupation, a club membership, or a shopping history of a user of said mobile station with said first set of particular locations.

7. The method of claim 2, wherein said second context parameter map associates light or sound intensity or spectra with said second set of particular locations.

8. The method of claim 2, wherein said second context parameter map associates temperature or pressure with said second set of particular locations.

9. The method of claim 1, wherein values in said context parameter map are time-dependent.

10. The method of claim 1, wherein said at least one sensor comprises an inertial sensor, a proximity sensor, a temperature sensor, a compass, a gravitometer, or an audio sensor.

11. The method of claim 1, wherein said estimating said location of said mobile station is further based, at least in part, on an association of a state of a user of said mobile station and said measurement value with said context parameter map.

12. The method of claim 11, wherein said state of said user comprises sitting, standing, or moving.

13. The method of claim 1, further comprising:
selectively downloading said context parameter map from a server based, at least in part, on a sensing capability of said mobile station.

14. The method of claim 1, further comprising:
classifying a motion of a user of the mobile station based, at least in part, on one or more signals received from said at least one sensor, wherein estimating the location is based, at least in part, on the classified motion.

15. The method of claim 1, wherein estimating a location of said mobile station is further based, at least in part, on an association of at least one attribute of a user of the mobile station and said measurement value with said context parameter map.

16. An apparatus comprising:
means for determining a measurement value based, at least in part, on a signal from at least one sensor on a mobile station;
means for selectively downloading a context parameter map from a server, said context parameter map being selected for downloading based, at least in part, on expected energy consumption and accuracy of a particular sensor of said mobile station, wherein measurements from said particular sensor correspond to one or more parameters included in said context parameter map, and
means for estimating a location of said mobile station based, at least in part, on an association of said measurement value with said context parameter map.

17. The apparatus of claim 16, wherein said context parameter map comprises a combined context parameter map including at least a first context parameter map associating user attributes with a first set of particular locations and a second context parameter map associating a first type of sensor measurements with a second set of particular locations.

18. The apparatus of claim 17, wherein said combined context parameter map further comprises a third context parameter map associating a second type of sensor measurements with a third set of particular locations.

19. The apparatus of claim 17, further comprising means for storing a user profile indicative of at least one attribute of a user of the mobile station.

20. The apparatus of claim 17, wherein said first context parameter map associates an age, an occupation, a club membership, or a shopping history of a user of said mobile station with said first set of particular locations.

21. The apparatus of claim 17, wherein said second context parameter map associates light or sound intensity or spectra with said second set of particular locations.

22. The apparatus of claim 17, wherein said second context parameter map associates temperature or pressure with said second set of particular locations.

23. The apparatus of claim 16, wherein values in said context parameter map are time-dependent.

24. The apparatus of claim 16, wherein said at least one sensor comprises an inertial sensor, a proximity sensor, a temperature sensor, a compass, a gravitometer, or an audio sensor.

25. The apparatus of claim 16, wherein said means for estimating said location of said mobile station comprises means for estimating said location based, at least in part, on an association of a state of a user of said mobile station and said measurement value with said context parameter map, said state comprising sitting, standing, or moving.

26. The apparatus of claim 16, further comprising:
means for selectively downloading said context parameter map from a server based, at least in part, on a sensing capability of said mobile station.

27. The apparatus of claim 16, further comprising:
means for classifying a motion of a user of the mobile station based, at least in part, on one or more signals received from said at least one sensor, wherein estimating the location is based, at least in part, on the classified motion.

28. An apparatus comprising:
a sensor configured to produce a signal based, at least in part, on a measurement of a sensor parameter; and
one or more processing units configured to:
determine a measurement value based, at least in part, on said signal from said sensor;
selectively download a context parameter map from a server, said context parameter map being selected for downloading based, at least in part, on expected energy consumption and accuracy of a particular sensor of said mobile station, wherein measurements from said particular sensor correspond to one or more parameters included in said context parameter map, and
estimate a location of a mobile station based, at least in part, on an association of said measurement value with said context parameter map.

29. The apparatus of claim 28, wherein said context parameter map comprises a combined context parameter map including at least a first context parameter map associating user attributes with a first set of particular locations and a second context parameter map associating a first type of sensor measurements with a second set of particular locations.

30. The apparatus of claim 29, wherein said combined context parameter map further comprises a third context parameter map associating a second type of sensor measurements with a third set of particular locations.

31. The apparatus of claim 29, further comprising a memory configured to store a user profile indicative of at least one attribute of a user of the mobile station.

32. The apparatus of claim 29, wherein said at least one attribute of said user comprises age, occupation, shopping preferences, or club membership.

33. The apparatus of claim 29, wherein said first context parameter map associates an age, an occupation, a club membership, or a shopping history of a user of said mobile station with said first set of particular locations.

34. The apparatus of claim 29, wherein said second context parameter map associates light or sound intensity or spectra with said second set of particular locations.

35. The apparatus of claim 29, wherein said second context parameter map associates temperature or pressure with said second set of particular locations.

36. The apparatus of claim 28, wherein values in said context parameter map are time-dependent.

37. The apparatus of claim 28, wherein said sensor comprises an inertial sensor, a proximity sensor, a temperature sensor, a compass, a gravitometer, or an audio sensor.

38. The apparatus of claim 28, wherein said estimating said location of said mobile station is further based, at least in part, on an association of a state of a user of said mobile station and said measurement value with said context parameter map.

39. The apparatus of claim 38, wherein said state of said user comprises sitting, standing, or moving.

40. The apparatus of claim 28, wherein said one or more processing units are configured to selectively download said context parameter map from a server based, at least in part, on a sensing capability of said mobile station.

41. The apparatus of claim 28, wherein said one or more processing units are configured to classify a motion of a user of the mobile station based, at least in part, on one or more signals received from said sensor, wherein estimating the location is based, at least in part, on the classified motion.

42. The apparatus of claim 28, wherein said one or more processing units are configured to estimate a location of said mobile station based, at least in part, on an association of at least one attribute of a user of the mobile station and said measurement value with said context parameter map.

43. A non-transitory storage medium comprising machine-readable instructions stored thereon that are executable by a special purpose computing device to:
   determine a measurement value based, at least in part, on a signal from at least one sensor on a mobile station;
   selectively download a context parameter map from a server, said context parameter map being selected for downloading based, at least in part, on expected energy consumption and accuracy of a particular sensor of said mobile station, wherein measurements from said particular sensor correspond to one or more parameters included in said context parameter map, and
   estimate a location of said mobile station based, at least in part, on an association of said measurement value with said context parameter map.

* * * * *